United States Patent [19]
Kelley et al.

[11] 4,251,169
[45] Feb. 17, 1981

[54] SINGLE LINE PNEUMATIC TUBE SYSTEM

[75] Inventors: Charles K. Kelley; William W. Jones, both of Houston, Tex.

[73] Assignee: Charles K. Kelley and Sons Inc., Houston, Tex.

[21] Appl. No.: 38,168

[22] Filed: May 11, 1979

Related U.S. Application Data

[62] Division of Ser. No. 876,112, Feb. 8, 1978, Pat. No. 4,189,261.

[51] Int. Cl.³ .............................................. B65G 51/26
[52] U.S. Cl. ................................................ 406/110
[58] Field of Search ....................... 406/110, 147, 176

[56] References Cited
U.S. PATENT DOCUMENTS
3,689,009  9/1972  Terrell ................................. 406/110

FOREIGN PATENT DOCUMENTS
2618407  11/1977  Fed. Rep. of Germany ........... 406/110

*Primary Examiner*—Jeffrey V. Nase
*Attorney, Agent, or Firm*—James Creighton Wray

[57] ABSTRACT

A single line (pressure-vaccum) pneumatic tube system capable of incorporating one or more novel intermediate stations. A unique pressure-vacuum chamber and a novel air shifter valve in the central station provides either pressure or vacuum for the system without turbulence or significant pressure drop. An air relief valve in the tubing significantly reduces noise at the end station. The end station is provided with a valve for return air. The system is unitized eliminating custom design of simple systems.

5 Claims, 2 Drawing Figures

SINGLE LINE PNEUMATIC TUBE SYSTEM

This is a division of application Ser. No. 876,112, filed Feb. 8, 1978, now U.S. Pat. No. 4,189,261.

BACKGROUND OF THE INVENTION

This invention relates to a unitized single line (pressure-vacuum) pneumatic tube system capable of incorporating intermediate stations, and novel components therefor.

Traditionally, pneumatic tube systems which deliver carriers to one or several locations and back have been custom designed, requiring extensive engineering and selection of various components. Single line pneumatic tube systems are well known in the prior art as exemplified by U.S. Pat. Nos. 2,137,750 and No. 3,232,559 and are utilized for drive-in banking and tolls as shown in U.S. Pat. No. 3,599,898 and No. 3,976,264. Such systems normally use a high powered turbine to provide the ncessary air; however, the noise level of the turbine is such that the turbines are located at a remote location from the terminals. Moreover, the air shifter valve for such a system is usually complicated and changes the direction of flow causing turbulence. Although some single line systems do use smaller blowers, they require a blower at each terminal location.

Accordingly, a need has existed for a unitized system which can be packaged and sold by the manufacturer as a complete system eliminating custom design. Also, there is a need for a simple single line pneumatic tube system having a single power unit which is sufficiently quiet that it can be installed in a room where people are working. There is also a need for an air shifter which eliminates changing direction of the air. Further, there is a need for a single line pneumatic tube system which has a minimum of noise at the end terminal and which can include intermediate terminals which can transmit a carrier in either direction without complicated valving.

SUMMARY OF THE INVENTION

The single line pneumatic tube system of the present invention is comprised basically of a central station, including a power unit and a central terminal; an end terminal; tubing connecting the terminals; and low voltage wiring. Intermediate terminals capable of transmitting a carrier in either direction may be included.

The power unit includes a pressure-vacuum chamber formed of a housing having a partition plate dividing the housing into two sealed chambers. One or more through fow blowers extend through the plate. The pressure-vacuum chamber has two spaced ports. Mounted on the ports is a novel air shifter valve connected by a length of flexible tubing to the central terminal. The valve has a motor driven angularly reciprocating plate connecting the flexible tubing to either the pressure or vacuum port of the pressure-vacuum chamber. Acoustical insulation in the chamber and housing reduce noise so that the central station may be located where personnel are working. To eliminate noise at the end terminal, the tubing remotely from the end terminal has a flapper valve which allows escape of the air permitting a negative drop to the terminal. The end terminal is provided with an automatic valve providing air during vacuum operation. Each terminal is provided with a guide to facilitate ease of initiating carrier transmission.

BRIEF DESCRIPTION OF THE DRAWINGS

A preferred embodiment of the invention—illustrative of the best mode in which applicants have contemplated applying the principles—is set forth in the following description and shown in the drawings, and is particularly and distinctly pointed out and set forth in the appended claims.

DESCRIPTION OF THE PREFERRED EMBODIMENT

Figure 1:
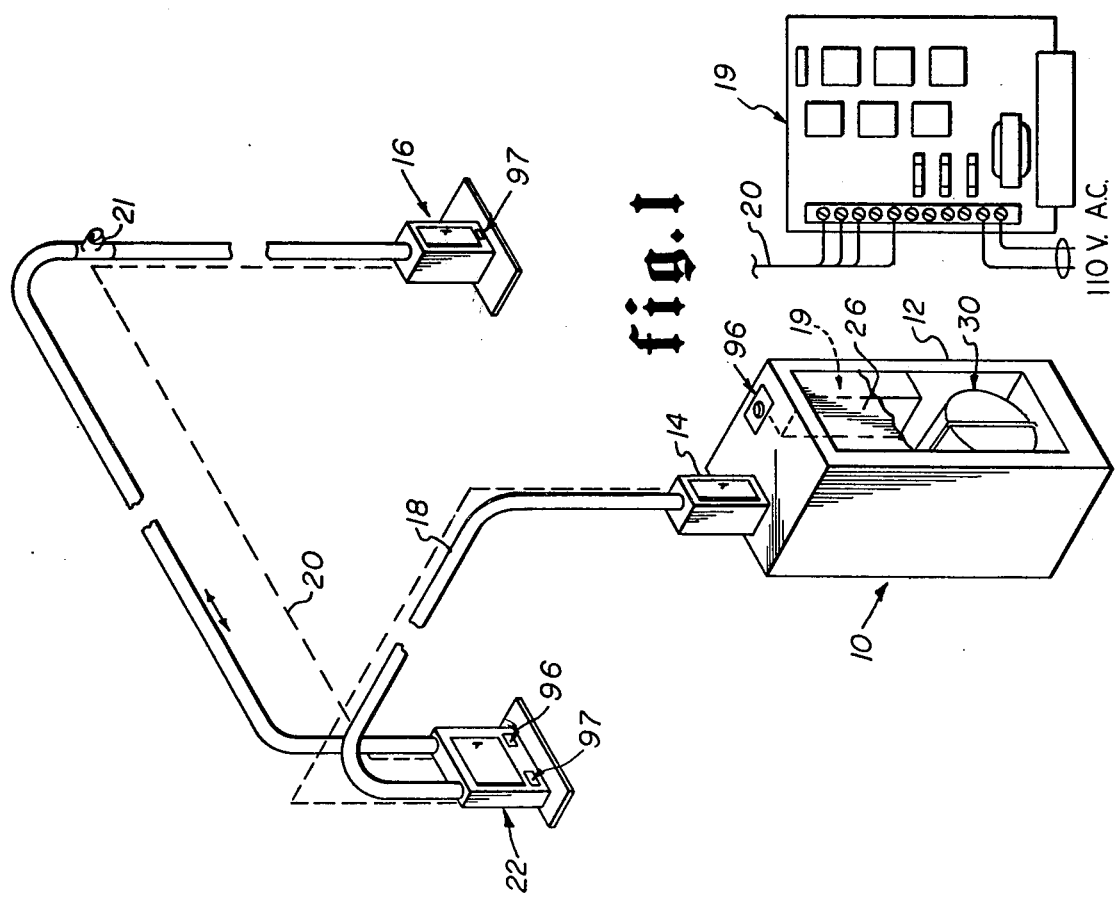
FIG. 1 is a general diagrammatic view showing the novel single tube pneumatic system of the present invention having one intermediate station.

As can be seen in FIG. 1, the basic single line pneumatic tube system of the present invention is comprised of a central station 10 which includes a power unit 12, and a central terminal 14, an end terminal 16, and tubing 18 connecting the terminals. The electronics 19 are located in the power unit and low voltage wiring 20 provides electrical connection between terminals. The tubing remote from the end terminal is provided with a flapper air relief valve 21 which will automatically exhaust air after a carrier has passed the air relief valve and therefore there is no air exhaust at the end terminal and practically no noise to disturb personnel in the area. If desired one or more intermediate terminals 22 may be incorporated into the system. The system is so designed that it may be packaged and sold by a manufacturer as a complete system eliminating custom design.

The central station is so designed that it resembles office furniture with the noise level being sufficiently low that it will not disturb normal office operations. The central station containing power unit 12 is the heart of the system replacing the high noise level turbine traditionally used to produce the air for the system. Moreover, the power unit 12 provides both pressure and vacuum for the entire system. The power unit 12 is formed of a rectangular sheet metal housing 24 having a removable front panel 26. All six interior sides of the housing are provided with acoustical padding 28, which may be sheets of polyester. A pressure-vacuum chamber 30 located in power unit 12 provides both pressure and vacuum. Each terminal is provided with a push button switch which is illuminated when on. The switch for pressure operation is labeled 96 and the one for vacuum operation 97. Engagement of any switch commences operation of the system.

Figure 2:
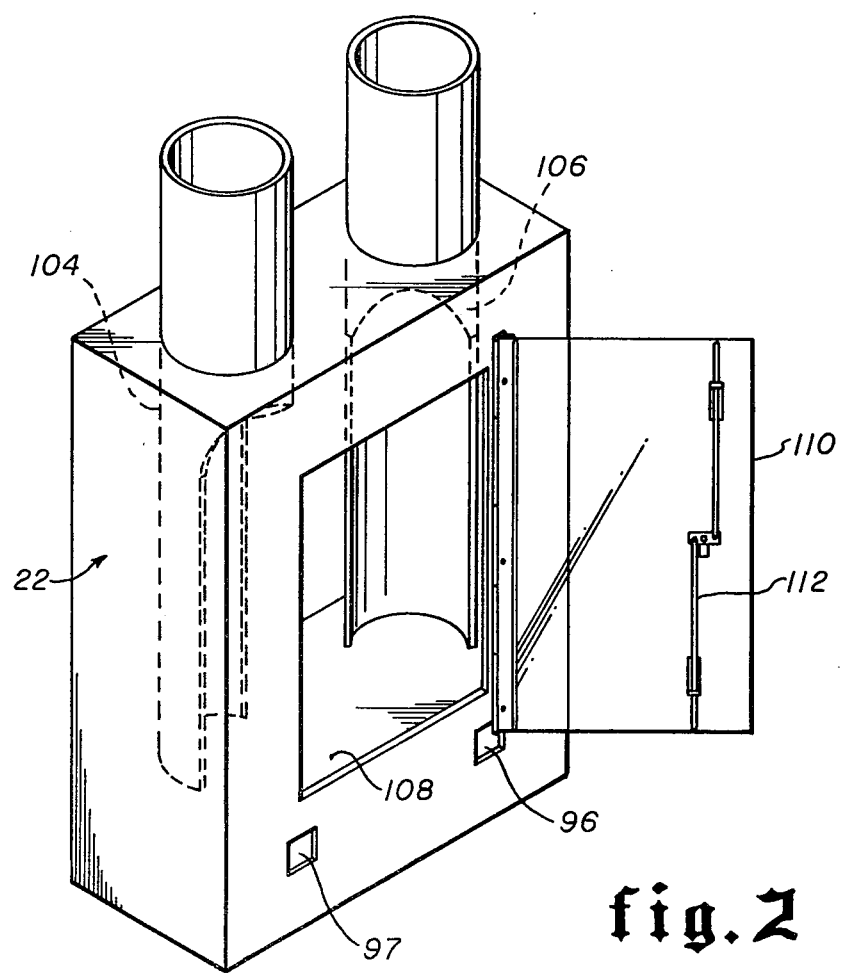
FIG. 2 is an isometric view of the intermediate terminal.

In addition to central terminal 14 and end terminal 16, the system may include one or more intermediate terminals 22. As can be seen in FIG. 2, the intermediate terminal is provided with two spaced facing guides 104—104 each of which has an opening portion facing the other. The guides similar to the guides of the other terminals have a portion of full tubing 106 for insertion of the carrier into the system. The intermediate terminal has a cushion 108 of shock absorbing material to absorb the shock of the carrier. The guides 104—104 are spaced a sufficient distance from the bottom of the terminal so that air may pass around the carrier after the carrier is in the terminal. The intermediate terminal is so designed that it will receive and transmit carriers from either direction. Accordingly, intermediate terminal 22 is provided with switch 96 to provide pressure operation to forward a carrier to end terminal 16 or another intermediate terminal. Terminal 22 is also provided with switch 97 to commence vacuum operation to return a carrier to the central terminal or an intermediate terminal located between the central terminal and intermediate terminal. Intermediate terminal 22 has a door 110 for removing or inserting a carrier. As can be seen in FIG. 2, the door 110 has a latch 112 which makes three point contact with the inside of the front panel to assure full closure. Door 88 of central terminal 14 is provided with similar latch. The latches provide positive closure for an air tight system.

As can be seen from the foregoing, the pneumatic tube system of the present invention is so designed that it may be packaged as a unit and easily installed. The central station includes the power unit and central terminal and the only electrical connection is attachment to a normal 120 volt alternating current outlet. Both pressure and vacuum is provided by the novel pressure-vacuum chamber that is powered by small flow through blowers. The system is shifted from pressure to vacuum by the novel air shifter valve which does not require changing of direction and subsequent turbulence. Intermediate terminals may be incorporated into the system and carriers may be received and transmitted in either direction from the intermediate terminal. To provide quiet operation at the end terminal, an air relief valve is located in the tubing remotely spaced from the end terminal. To provide air in back of the carrier during vacuum operation, the end terminal has a flaper valve which atomatically opens during vacuum operation.

What is claimed is:

1. An intermediate terminal for a single line pneumatic tube system comprising a housing having two ports, two sections of tubing each extending into one port, each section of tubing having an inward opening semicylindrical guide portion extending into the housing and terminating above the bottom of the terminal, the guide portions being similar and spaced and facing each other so that air will flow around the carrier, each guide portion having a full tubing section extending into the terminal to facilitate insertion of a carrier for transmission, the terminal receiving and transmitting carriers in either direction through either port.

2. The intermediate terminal specified in claim 1 wherein there is a cushion at the bottom of the terminal to absorb shock.

3. The intermediate terminal specified in claim 1 further comprising a switch to initiate pressure operation in the housing.

4. The intermediate terminal specified in claim 1 further comprising a switch to commence vacuum operation in the housing.

5. The intermediate terminal specified in claim 1 wherein the terminal further comprises a door having a three point contact.

* * * * *